US012610287B2

(12) United States Patent
Muthukumar et al.

(10) Patent No.: US 12,610,287 B2
(45) Date of Patent: Apr. 21, 2026

(54) N10 MESSAGING OPTIMIZATION

(71) Applicant: T-MOBILE INNOVATIONS LLC, Overland Park, KS (US)

(72) Inventors: Praveen Singaram Muthukumar, Lawrenceville, NJ (US); Sandesh Shama Shetty, Sammamish, WA (US); Rushabhkumar Patel, Newcastle, WA (US); Rahul Pal, Bothell, WA (US); Erik Kosar, Newcastle, WA (US); Agastya Kohli, Kirkland, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 414 days.

(21) Appl. No.: 18/198,560

(22) Filed: May 17, 2023

(65) Prior Publication Data

US 2024/0388972 A1 Nov. 21, 2024

(51) Int. Cl.
*H04W 36/00* (2009.01)
*H04W 36/14* (2009.01)

(52) U.S. Cl.
CPC ..... *H04W 36/0005* (2013.01); *H04W 36/144* (2023.05)

(58) Field of Classification Search
CPC ......................... H04W 36/0005; H04W 36/144
See application file for complete search history.

(56) References Cited

U.S. PATENT DOCUMENTS

2023/0276220 A1* 8/2023 Wang .................... H04W 60/00
370/331

* cited by examiner

*Primary Examiner* — Justin Y Lee
(74) *Attorney, Agent, or Firm* — SHOOK, HARDY & BACON L.L.P.

(57) ABSTRACT

Systems and methods are provided for optimizing N10 interface messaging. Specifically, registration messages, de-registration messages, and the like can be dynamically controlled such that communication is prevented. Said messages are communicated via an N10 interface between a Unified Data Management function (UDM) and a Session Management function (SMF) in a 5G network. Additionally, subscription information, user profile information, etc., is also communicated via the N10 interface. Thus, the N10 interface can easily become overloaded or congested. Aspects herein provide mechanisms to avoid additional congestion of the N10 interface by intelligently eliminating specific messages communicated to the UDM via the N10 interface.

18 Claims, 6 Drawing Sheets

200

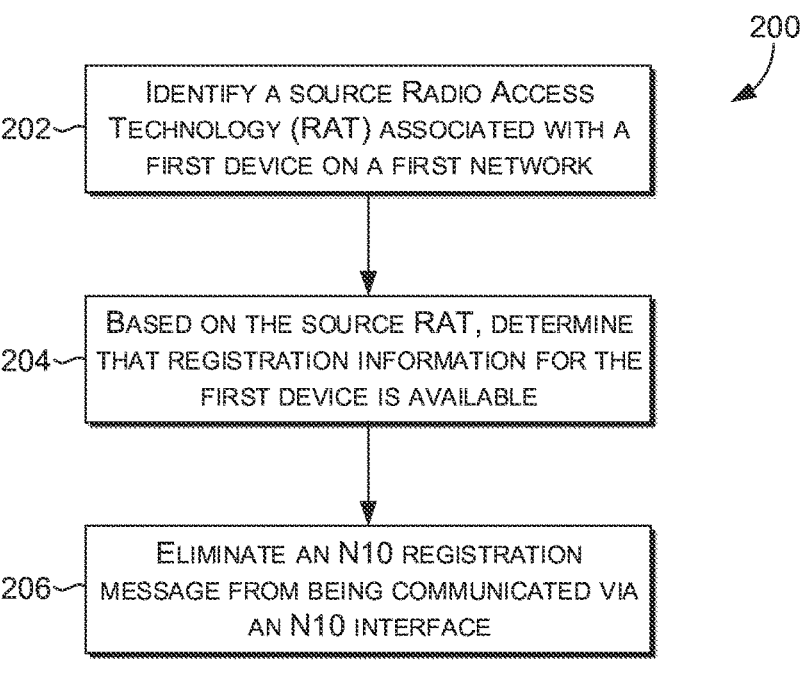

202 — IDENTIFY A SOURCE RADIO ACCESS TECHNOLOGY (RAT) ASSOCIATED WITH A FIRST DEVICE ON A FIRST NETWORK

204 — BASED ON THE SOURCE RAT, DETERMINE THAT REGISTRATION INFORMATION FOR THE FIRST DEVICE IS AVAILABLE

206 — ELIMINATE AN N10 REGISTRATION MESSAGE FROM BEING COMMUNICATED VIA AN N10 INTERFACE

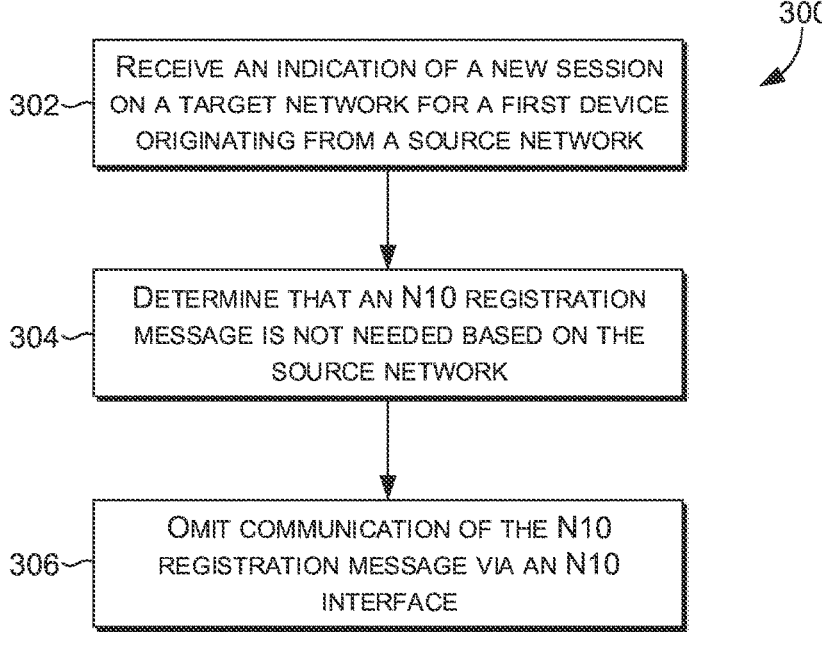

302 — RECEIVE AN INDICATION OF A NEW SESSION ON A TARGET NETWORK FOR A FIRST DEVICE ORIGINATING FROM A SOURCE NETWORK

304 — DETERMINE THAT AN N10 REGISTRATION MESSAGE IS NOT NEEDED BASED ON THE SOURCE NETWORK

306 — OMIT COMMUNICATION OF THE N10 REGISTRATION MESSAGE VIA AN N10 INTERFACE

FIG. 3

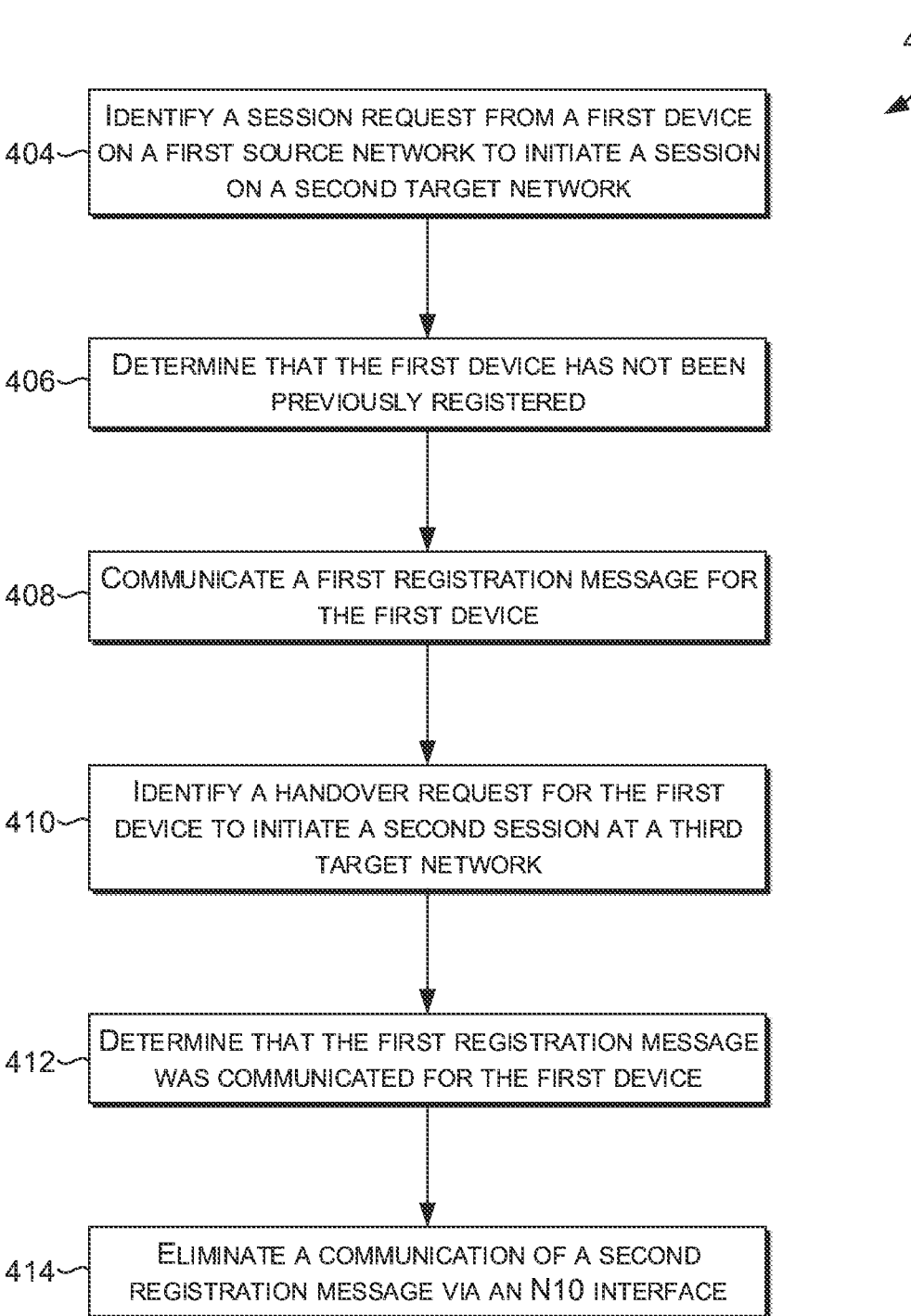

400

404 — IDENTIFY A SESSION REQUEST FROM A FIRST DEVICE ON A FIRST SOURCE NETWORK TO INITIATE A SESSION ON A SECOND TARGET NETWORK

406 — DETERMINE THAT THE FIRST DEVICE HAS NOT BEEN PREVIOUSLY REGISTERED

408 — COMMUNICATE A FIRST REGISTRATION MESSAGE FOR THE FIRST DEVICE

410 — IDENTIFY A HANDOVER REQUEST FOR THE FIRST DEVICE TO INITIATE A SECOND SESSION AT A THIRD TARGET NETWORK

412 — DETERMINE THAT THE FIRST REGISTRATION MESSAGE WAS COMMUNICATED FOR THE FIRST DEVICE

414 — ELIMINATE A COMMUNICATION OF A SECOND REGISTRATION MESSAGE VIA AN N10 INTERFACE

FIG. 4

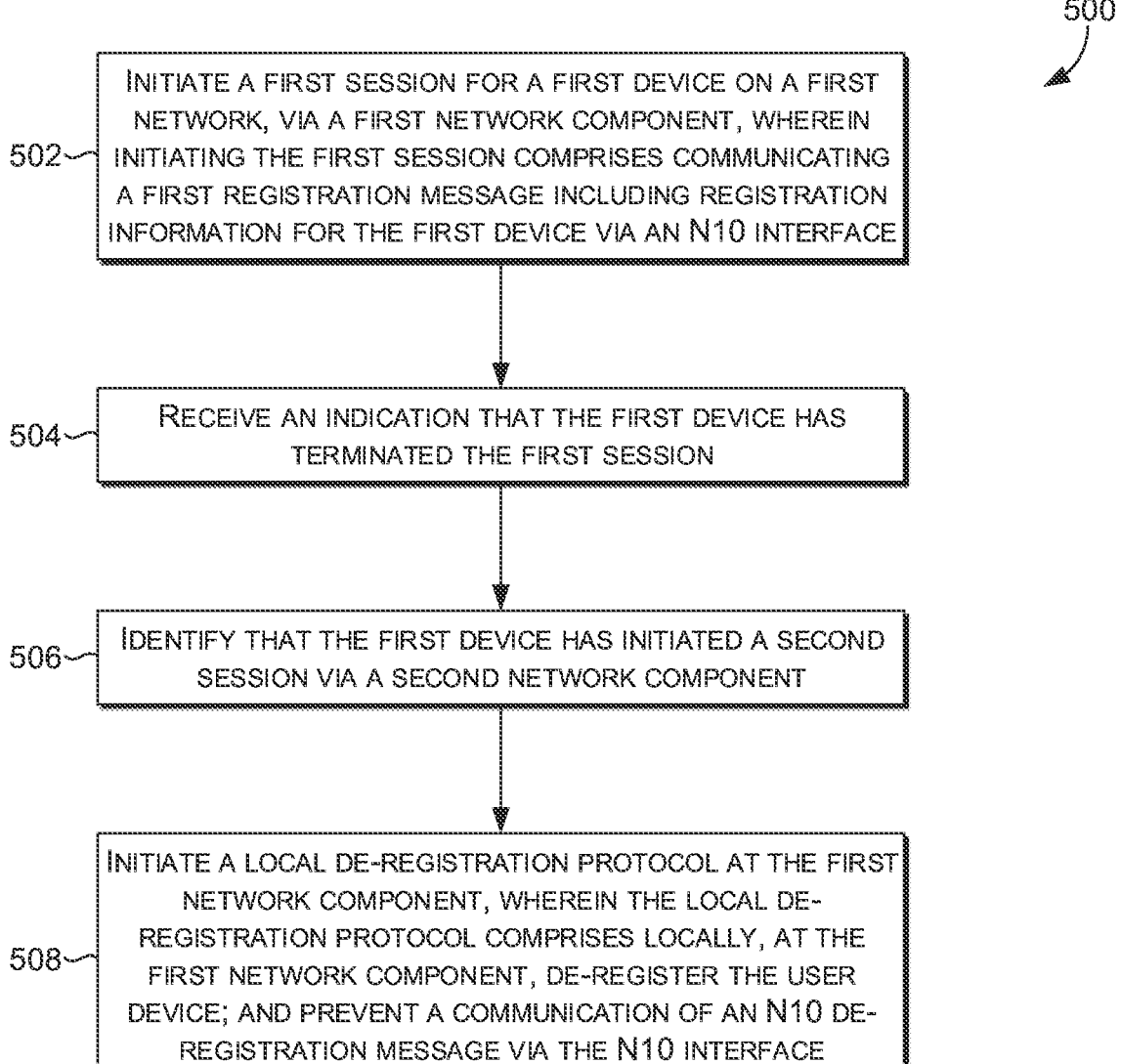

500

502 — INITIATE A FIRST SESSION FOR A FIRST DEVICE ON A FIRST NETWORK, VIA A FIRST NETWORK COMPONENT, WHEREIN INITIATING THE FIRST SESSION COMPRISES COMMUNICATING A FIRST REGISTRATION MESSAGE INCLUDING REGISTRATION INFORMATION FOR THE FIRST DEVICE VIA AN N10 INTERFACE

504 — RECEIVE AN INDICATION THAT THE FIRST DEVICE HAS TERMINATED THE FIRST SESSION

506 — IDENTIFY THAT THE FIRST DEVICE HAS INITIATED A SECOND SESSION VIA A SECOND NETWORK COMPONENT

508 — INITIATE A LOCAL DE-REGISTRATION PROTOCOL AT THE FIRST NETWORK COMPONENT, WHEREIN THE LOCAL DE-REGISTRATION PROTOCOL COMPRISES LOCALLY, AT THE FIRST NETWORK COMPONENT, DE-REGISTER THE USER DEVICE; AND PREVENT A COMMUNICATION OF AN N10 DE-REGISTRATION MESSAGE VIA THE N10 INTERFACE

FIG. 5

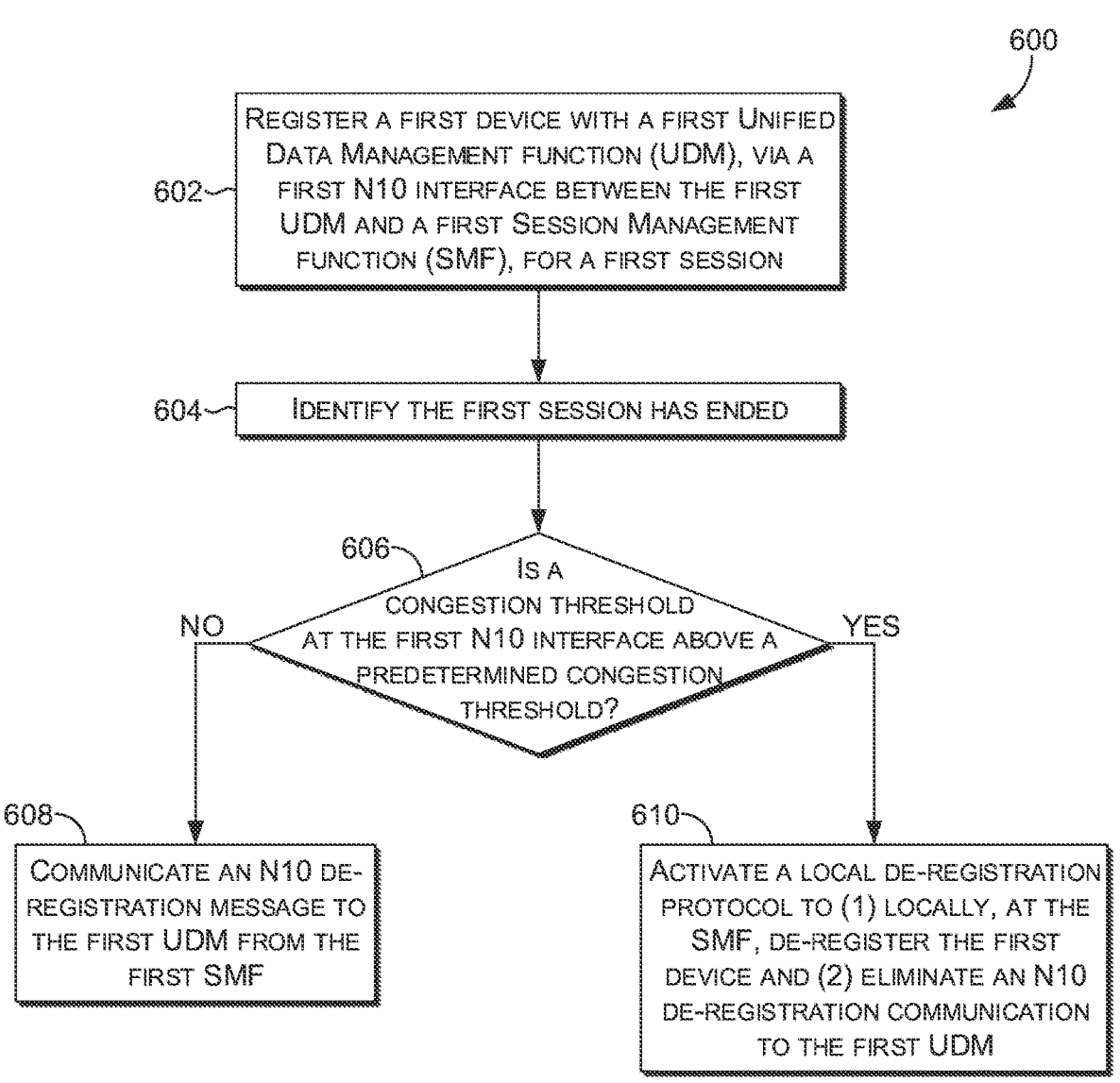

600

602 — REGISTER A FIRST DEVICE WITH A FIRST UNIFIED DATA MANAGEMENT FUNCTION (UDM), VIA A FIRST N10 INTERFACE BETWEEN THE FIRST UDM AND A FIRST SESSION MANAGEMENT FUNCTION (SMF), FOR A FIRST SESSION

604 — IDENTIFY THE FIRST SESSION HAS ENDED

606 — IS A CONGESTION THRESHOLD AT THE FIRST N10 INTERFACE ABOVE A PREDETERMINED CONGESTION THRESHOLD?

NO                                                        YES

608 — COMMUNICATE AN N10 DE-REGISTRATION MESSAGE TO THE FIRST UDM FROM THE FIRST SMF

610 — ACTIVATE A LOCAL DE-REGISTRATION PROTOCOL TO (1) LOCALLY, AT THE SMF, DE-REGISTER THE FIRST DEVICE AND (2) ELIMINATE AN N10 DE-REGISTRATION COMMUNICATION TO THE FIRST UDM

FIG. 6

N10 MESSAGING OPTIMIZATION

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for optimizing messaging functions over an N10 interface of a 5G core network. More particularly, in aspects set forth herein, systems and methods enable a Session Management Function (SMF) to intelligently and dynamically determine which messages to send to a Unified Data Management function (UDM) and when to send said messages, via the N10 interface between the SMF and the UDM.

BRIEF DESCRIPTION OF THE SEVERAL VIEWS OF THE DRAWINGS

Implementations of the present disclosure are described in detail below with reference to the attached drawing figures, wherein:

FIG. 2 depicts a flow diagram of a method for optimizing N10 communications, in accordance with aspects herein;

FIG. 3 depicts a flow diagram of a method for optimizing N10 communications, in accordance with aspects herein;

FIG. 4 depicts a flow diagram of a method for optimizing N10 communications, in accordance with aspects herein;

FIG. 5 depicts a flow diagram of a method for optimizing N10 communications, in accordance with aspects herein;

FIG. 6 depicts a flow diagram of a method for optimizing N10 communications, in accordance with aspects herein.

DETAILED DESCRIPTION

Figure 1:
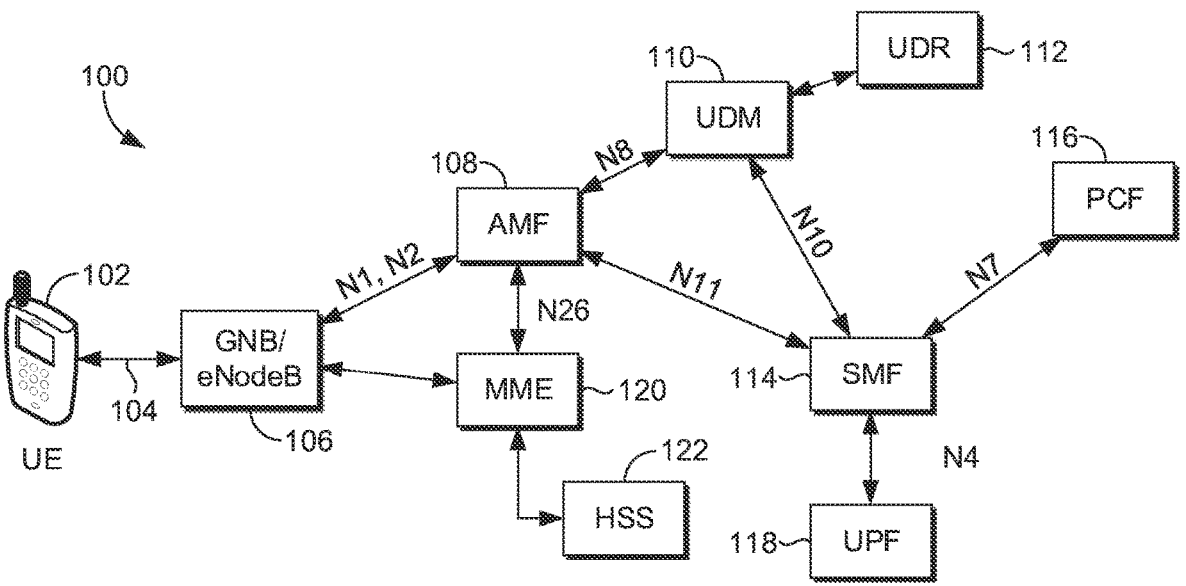
FIG. 1 depicts a diagram of an exemplary network environment in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| AMF | Access & Mobility Management Function |
| APN | Access Point Name |
| CD-ROM | Compact Disk Read Only Memory |
| CDMA | Code Division Multiple Access |
| eNodeB | Evolved Node B |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MIMO | Multiple Input Multiple Output |
| MD | Mobile Device |
| PC | Personal Computer |
| PCF | Policy Control Function |
| PCS | Personal Communications Service |
| PDA | Personal Digital Assistant |
| RAM | Random Access Memory |
| RET | Remote Electrical Tilt |
| RF | Radio-Frequency |
| RFI | Radio-Frequency Interference |
| R/N | Relay Node |
| ROM | Read Only Memory |
| SINR | Transmission-to-Interference-Plus-Noise Ratio |
| SMF | Session Management Function |
| SNR | Transmission-to-noise ratio |
| SON | Self-Organizing Networks |
| TDMA | Time Division Multiple Access |
| TXRU | Transceiver (or Transceiver Unit) |
| UDM | Unified Data Management Function |
| UDR | Unified Data Repository |
| UE | User Equipment |
| UPF | User Plane Function |

Further, various technical terms are used throughout this description. An illustrative resource that fleshes out various aspects of these terms can be found in Newton's Telecom Dictionary, 32d Edition (2022).

As used herein, the term "node" is used to refer to network access technology for the provision of wireless telecommunication services from a base station to one or more electronic devices, such as an eNodeB, gNodeB, etc.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., cell sites, cell towers) to provide network coverage. The base stations are employed to broadcast and transmit transmissions to user devices of the telecommunications network. An access point may be considered to be a portion of a base station that may comprise an antenna, a radio, and/or a controller.

As employed herein, a UE (also referenced herein as a user device) or WCD can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

In conventional cellular communications technology, a 5G telecommunications network comprises a 5G Core Network (5GC) and a gNB. The 5GC architecture, as known to those in the art, relies on a Service-Based Architecture (SBA) framework where the architecture elements are defined in terms of Network Functions (NF) rather than by traditional network entities. Using interfaces of a common framework, any NF can offer its services to other NFs that are permitted to make use of their functions. At times, the network interfaces can experience complete failures, degradations, congestion, and the like. This compromises the ability of other NFs to obtain necessary data to establish reliable sessions for UEs.

The present disclosure is directed to optimization of an N10 interface, in particular. The N10 interface is the connection between the Unified Data Management Function (UDM) and the Session Management Function (SMF). Among other functions, the UDM is responsible for retrieving subscriber data from a data repository (e.g., a Unified Data Repository (UDR)) and communicating it to the SMF, which the SMF utilizes for managing user sessions on the network. The SMF also handles registration of a UE each time a UE seeks to initiate a session on the network including original sessions (e.g., a "fresh attach") or hand-offs. In short, the SMF is querying the UDM regarding user subscription information and receiving responses back from the UDM regarding the user subscription information while also managing to communicate registration information to the UDM and receiving replies back from the UDM regarding the registration. Additionally, de-registration procedures also occur via the N10 interface. Put simply, when a UE leaves a network, it is de-registered at the UDM by the SMF. All of this interaction between the UDM and SMF occurs via the N10 interface.

When the UDM, or the interface between the SMF and the UDM (i.e., the N10 interface), is experiencing degradations (e.g., congestion) that delay or prohibit a reply to the SMF, the necessary information from the UDM is unattainable and results in a failure to establish a session for the UE. Conventional systems are prone to such degradations since every message discussed above is sent to the UDM until a reply is received. This results in unnecessary noise at the UDM (or on the N10 interface).

The present disclosure can configure an intelligent optimization system to intelligently manage the communication of N10 messages to the UDM. For instance, congestion thresholds can be utilized to determine whether it is appropriate to send a message at this time or if it can be held until a later time when less congestion may be present on the N10 interface. Further, the SMF can intelligently determine if a message needs to be sent at all based on an originating network for the UE attempting to initiate a session.

Accordingly, a first aspect of the present disclosure is directed to a system for optimizing N10 interface communications. The system comprises one or more processors and one or more computer-readable media storing computer-usable instructions that, when executed by the one or more processors, cause the one or more processors to: identify a source Radio Access Technology (RAT) associated with a first device on a first network; based on the source RAT, determine that registration information for the first device is available; and eliminate an N10 registration message from being communicated via an N10 interface.

A second aspect of the present disclosure is directed to a method for optimizing N10 interface communications. The method comprises: receiving an indication of a new session on a target network for a first device originating from a source network; determining that an N10 registration message is not needed based on the source network; and omitting communication of the N10 registration message via an N10 interface.

A third aspect of the present disclosure is directed to a system for optimizing N10 interface communications. The system comprises one or more processors and one or more computer-readable media storing computer-usable instructions that, when executed by the one or more processors, cause the one or more processors to: identify a session request from a first device on a first source network to initiate a session on a second target network; determine that the first device has not been previously registered; and communicate a first registration message for the first device; identify a handover request for the first device to initiate a second session at a third target network; determine that the first registration message was communicated for the first device; and eliminate a communication of a second registration message via an N10 interface. A method for the same is also provided herein.

Another aspect of the present disclosure is directed to a system for optimizing N10 interface communications. The system comprises one or more processors and one or more computer-readable media storing computer-usable instructions that, when executed by the one or more processors, cause the one or more processors to: register a first device with a first Unified Data Management function (UDM), via a first N10 interface between the first UDM and a first Short Message Service function (SMF), for a first session; identify the first session has ended; and determine whether a congestion threshold at the first N10 interface is above a predetermined congestion threshold. Based on a determination that the congestion threshold does not exceed the predetermined congestion threshold, an N10 de-registration message is communicated to the first UDM from the first SMF. Based on a determination that the congestion threshold does exceed the predetermined congestion threshold, a local de-registration protocol is activated. The local de-registration protocol can (1) locally, at the SMF, de-register the first device and (2) eliminate an N10 de-registration communication to the first UDM.

Turning to FIG. 1, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 7:
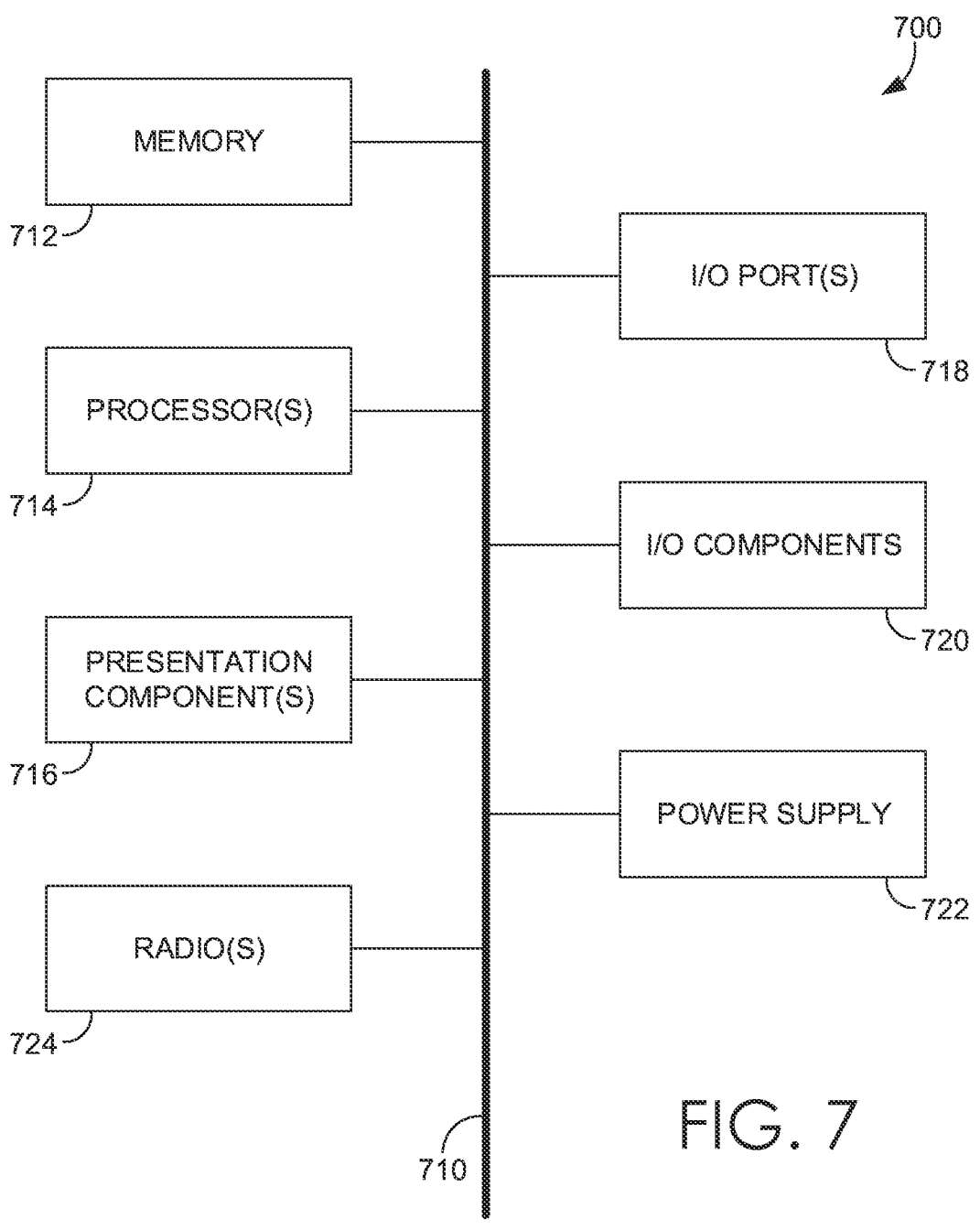
FIG. 7 depicts a diagram of an exemplary computing environment suitable for use in implementations of the present disclosure, in accordance with aspects herein.

A network cell may comprise a base station to facilitate wireless communication between a communications device within the network cell, such as communications device 700 described with respect to FIG. 7, and a network. As shown in FIG. 1, communications device may be UE 102. In the network environment 100, UE 102 may communicate with other devices, such as mobile devices, servers, etc. The UE 102 may take on a variety of forms, such as a personal computer, a laptop computer, a tablet, a netbook, a mobile phone, a Smart phone, a personal digital assistant, or any other device capable of communicating with other devices. For example, the UE 102 may take on any form such as, for example, a mobile device or any other computing device capable of wirelessly communication with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, UE 102 comprises a wireless or mobile device with which a wireless telecommunication network(s) can be utilized for communication (e.g., voice and/or data communication). In this regard, the UE 102 can be any mobile computing device that communicates by way of, for example, a 5G network.

The UE 102 may utilize a network to communicate with other computing devices (e.g., mobile device(s), a server(s), a personal computer(s), etc.). In embodiments, the network is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. The network may include multiple networks. The network may be part of a telecommunications network that connects subscribers to their immediate service provider. In embodiments, network 122 is associated with a telecommunications provider that provides services to user devices, such as UE 102. For example, the network may provide voice services to user devices or corresponding users that are registered or subscribed to utilize the services provided by a telecommunications provider.

Accessing the telecommunications network is initiated at the gNodeB 106 via communication link 104. The N1 and N2 interface are essential links from the UE 102 and gNodeB 106 to the Access & Mobile Function (AMF) 108. The N1 interface is a transparent interface from the UE 102 to the AMF 108. It is used to transfer UE information to the AMF 108. The N2 interface connects the gNodeB 106 to the AMF 108. N2 is important to connect the UE 102 to the network so that the UE 102 can access service. The AMF 108 handles connection and management mobility tasks. Essentially, the AMF 108 plays the role of the access point to the 5GC. The AMF 108 communicates with the Unified Data Management function (UDM) 110 and the Session Management Function (SMF) 114, among others, via the N8 and N11 interfaces, respectively. The N8 interface is the interface between the AMF 108 and the UDM 110. It is used during the registration process when the AMF 108 needs user data from the UDM 110 for UE authentication purposes. The N11 interface is the interface between the AMF 108 and the SMF 114. The SMF 114 interacts with the AMF 108 to establish, manage, and terminate sessions. Essentially, when the UE 102 requests a new session, the UE 102 and the gNodeB 106 use the N1 and N2 interfaces to carry messages to the AMF 108. The AMF 108 takes care of connection and mobility management and then passes the request on to the SMF 114 via the N11 interface.

The UDM 110 is responsible for obtaining subscriber data that the SMF 114 accesses for managing user sessions on the network. Communications between the UDM 110 and the SMF 114, including requests from the SMF 114 to the UDM 110 and responses from the UDM 110 to the SMF 114, utilize the N10 interface. The UDM 110 can obtain subscriber data requested by the SMF 114 from a Unified Data Repository (UDR) 112 that stores the user information. While only one UDR is shown for simplicity in FIG. 1, it should be understood that the UDM 110 can be associated with more than one UDR.

The SMF 114 also communicates with the Policy Control Function (PCF) 116 via the N7 interface. The communication via the N7 interface triggers session management policies towards the SMF 114. The SMF 114 further communicates with the User Plane Function (UPF) 118 via the N4 interface. The N4 interface is essential to provide necessary instructions to control and deliver the desired Quality of Service (QOS).

Returning now to the N10 interface, once the AMF 108 triggers the SMF 114 that a new session is requested, the SMF 114 has a variety of functions to perform with respect to the UDM 110 via the N10 interface. The SMF 114 can query the UDM 110 for user/subscriber data (e.g., subscription fetch messages and subscribe to notify messages). The SMF 114 also sends registration information to the UDM 110 to register a UE to the network. Thus, in a typical scenario when a UE accesses a network, the SMF 114 sends three separate messages to the UDM 110 via the N10 interface: a registration message, a subscription fetch message (to retrieve subscriber information) and a subscribe to notify message (to be notified of any changes to subscriber information). Further, the SMF 114 should receive a reply from the UDM 110 via the N10 interface for each of the queries. The UDM 110 can also communicate with multiple SMFs at one time so it may simultaneously be communicating replies to the queries for multiple SMFs regarding multiple user sessions at once. Additionally, when a UE leaves a network or power cycles, the SMF 114 sends a de-registration message and a unsubscribe to notify message to the UDM 110. This is a massive load for the UDM 110 and is frequently unable to respond due to congestion.

Rather than further contributing to this overload of the UDM 110 via the N10 interface, the SMF 114 can intelligently determine when to send messages via the N10 interface and what messages should be sent. In embodiments, the SMF 114 can intelligently manage each of registration messages, de-registration messages, subscription fetch messages, and subscribe/unsubscribe to notify messages. This intelligent management can be done by identifying a source Radio Access Technology (RAT), a congestion threshold at the N10 interface, or a combination thereof.

The present disclosure allows the SMF 114 to intelligently manage a plurality of messages (e.g., what messages are sent and when messages are sent). As noted, this can be done by identification of a source RAT for a UE. Below is an exemplary Table 1 illustrating examples of when the SMF 114 can eliminate a registration message to the UDM 110. Each of these instances will be further discussed below.

TABLE 1

IP Multimedia Subsystem (IMS) Access Point Name (APN):

| Source RAT | Target RAT | N10 Registration Message? | Other N10 Messages? |
|---|---|---|---|
| Wi-Fi | n/a | Yes | No |
| LTE | n/a | No | No |
| 5G | n/a | Yes | Yes |
| Wi-Fi | LTE | No | No |
| Wi-Fi | 5G | No | Optional |
| LTE | 5G | No | Optional |
| LTE | Wi-Fi | No | No |
| 5G | LTE | No | No |
| 5G | Wi-Fi | No | No |

The above table applies when a UE has an IMS APN, which indicates a voice, text, or video call/message. As indicated above, when a UE is on Wi-Fi RAT, SMF 114 is required to send an N10 registration message alone but can intelligently eliminate the other N10 message (i.e., subscription fetch, subscribe to notify, etc.). This intelligent elimination is possible since the SMF 114 can identify the Wi-Fi as the source RAT and determine that the other N10 message information will be acquired from the Evolved Packet Data Gateway (ePDG) in the Wi-Fi network. In other words, the ePDG communicates the subscription fetch, subscribe to notify, etc., information directly to the SMF 114. It should be noted here that the N10 registration message is still required in this instance to ensure a successful handover (HO) to a 5G network or LTE network in the event it is needed. Otherwise, the HO would fail.

The second situation noted above is a UE on LTE RAT. An N10 registration message is not needed here. In this instance, the SMF 114 receives the needed information directly from a Mobility Management Entity (MME) 120 of the LTE network. This includes subscribe to notify, subscription fetch, quality of service indicators, etc., that is directly communicated to the SMF 114 from the MME 120. In other words, the UE was already registered on the LTE network by the MME 120 and the N10 procedure information would be sent to the SMF 114, so there is no need to duplicate the registration.

The third instance above illustrates a fresh attach to a 5G network. A fresh attach, as used herein, refers generally to an initial access of a network without a previous registration that is active. Here, the SMF 114 would operate in the normal manner. Registration has not yet been performed so all the needed messages are communicated such as the N10 registration, subscribe to notify, subscription fetch, etc. Further, on a 5G network the SMF 114 is responsible for registration and, in the instance of a fresh attach, there are no other network components from which to pull this information.

Next, the instance where a source Wi-Fi RAT is looking to make a HO to LTE is provided. As shown in Table 1, an N10 registration message is not needed and neither are the additional N10 messages. The registration procedure here would have been completed when the UE was on the Wi-Fi RAT and is not performed by the MME when the switch is made to LTE.

In the fifth example, a situation of a source Wi-Fi RAT HO to 5G is desired. Here, an N10 registration message is not required. The registration procedure would have already been completed when the UE was on Wi-Fi so the information would be passed along directly to the SMF 114 during the HO to the 5G network. Other N10 messages are not necessary to be communicated to the UDM 110 since we already have this information from the attachment to Wi-Fi. However, the other N10 messages can be communicated to identify any unique information that was not communicated by the ePDG of the source Wi-Fi RAT. For example, 5G Quality of Service (QOS) wouldn't be provided by the ePDG as it is not a 5G network and doesn't provide the same QOS indicates as those provided in a 5G network.

Next, a situation of a source LTE RAT HO to 5G is desired. An N10 registration message is not needed in this instance. Similar to the Wi-Fi to 5G HO, in an LTE to 5G HO the registration would have already been completed by the MME 120 when on LTE. The Home Subscriber Server (HSS) 122 and UDM of a 5G network are converged together and can exchange information. Thus, the information is communicated directly to the SMF 114 from the MME 120 and is not communicated to the UDM 110 via the N10 interface since the UDM 110 already has the information. As noted above with respect to the Wi-Fi to 5G HO, the other N10 messages can be communicated to identify any unique information that was not communicated by the MME 120 of the source LTE RAT. For example, 5G Quality of Service (QOS) wouldn't be provided by the MME 120 as it is not a 5G network and doesn't provide the same QOS indicates as those provided in a 5G network.

Moving along, the next instance shown in Table 1 is a LTE RAT HO to Wi-Fi. The SMF 114 does not communicate an N10 registration message in this instance, nor does it communicate any of the other N10 messages. As with other examples, the registration would have been completed when the UE was on LTE by the MME. The HSS/UDM convergence would have already provided that information to the UDM and the MME would have already sent the information to the SMF 114. Further, the HSS is a common note between LTE and Wi-Fi so the ePDG is able to obtain the information from the HSS. There is no need for the SMF 114 to assist with registration in this instance.

The next instance shown in Table 1 is a 5G RAT HO to LTE. In this instance, registration was already performed at the 5G network when the UE was attached to the source RAT, so registration is not needed again since the LTE has access to that information from the HSS 122 and/or UDM 110. In the event the UE were to return to the 5G network via a HO from the LTE, registration would not be needed there either since the SMF 114 can obtain the already-acquired N10 procedure information from the MME 120.

The final example shown in Table 1 for an IMS APN is a 5G RAT HO to Wi-Fi. Like the previous example, registration was already performed at the 5G network when the UE attached to the source RAT.

All of the above examples provide ways for the SMF 114 to reduce N10 interface traffic. IMS APNs are not the only opportunity for N10 optimizations. Internet APNs can also be optimized such that unnecessary messaging is eliminated using the source RAT as a trigger to the SMF 114 to identify when to send messages and when messages are not needed. Table 2 below illustrates exemplary Internet APN situations where optimization can be used.

TABLE 2

| Internet APN: | | | |
|---|---|---|---|
| Source RAT | Target RAT | N10 Registration Message? | Other N10 Messages? |
| Wi-Fi | n/a | No | No |
| LTE | n/a | No | No |
| 5G | n/a | Yes | Yes |
| LTE | 5G | No | Optional |
| 5G | LTE | No | No |

The examples provided in Table 2 are similar to those discussed with respect to Table 1 in that the N10 interface can be optimized by eliminating messages where data was already provided. For instance, when a UE is coming from an LTE network, the MME 120 would have already registered the device so the SMF of a 5G network does not need to re-register. Additionally, a UE coming from a Wi-Fi network would have also registered a device so duplicate registrations are not needed by a SMF.

Initially, a UE is utilizing an Internet APN on a source Wi-Fi RAT. SMF 114 does not need to send an N10 registration message (or other N10 messages) since that traffic is handled by a Wi-Fi operator. A telecommunications network is not needed (or registration thereto) in order to browse using Wi-Fi.

Next, a UE utilizing LTE is listed. The SMF 114 does not need to send an N10 registration message (or other N10 message) since the MME 120 would have already completed the registration and sent the information to the UDM 122. The MME 120 provides other N10 information directly to the SMF 114 as the registration message has already been provided to the UDM 110. The same is said for information associated with the other N10 messages as it is also provided by the MME 120.

Next, a UE utilizing 5G is listed. This is illustrated as a fresh attach to the 5G network since there is no other location from which to pull registration information. The SMF 114 would operate as is typical in an initial registration situation and communicate each of the N10 registration and the other N10 messages via the N10 interface to the UDM 110.

The next example is a source LTE RAT to target 5G RAT. The SMF 114 does not communicate an N10 registration message in this instance. As discussed at length, the MME 120 of the LTE network completes registration and the HSS 122 and/or UDM 110 has that registration information already. The N10 procedure information is also communicated directly from the MME 120 to the SMF 114 of the 5G network. The SMF 114 may communicate other N10 messages to identify any unique information that cannot be acquired from the MME 120 (e.g., 5G QOS).

Lastly, a source 5G RAT transfer to LTE is listed. The SMF 114 does not need to send an N10 registration message or other N10 messages here. The registration was already completed during an initial attach to the 5G network.

In addition to the embodiments described above where the SMF 114 can utilize a source RAT to determine whether N10 messages should be sent, the SMF 114 can also utilize a congestion threshold to manage N10 messaging. When a congestion threshold of the N10 interface is greater than a predetermined congestion threshold, the SMF 114 can delay the message for a predetermined period of time. Upon expiration of the predetermined period of time, the SMF 114 can reevaluate the congestion threshold. If the congestion threshold is lower than the predetermined congestion threshold, the message may be sent. If the congestion threshold is still great than the predetermined threshold, the message may be delayed again or, depending on the message, eliminated altogether.

The other N10 messages described in Table 1 or 2 as being optional at particular times are examples of messages that may be delayed or eliminated. As described in those examples, the other N10 messages are not always required and, in situations where they are optional, may be optimally communicated via the N10 interface when the congestion threshold is below the predetermined congestion threshold.

Thus far, the description has focused on the registration aspects of N10 messaging including registration, subscription fetch, and subscribe to notify procedures. The present disclosure further includes embodiments where de-registration messaging can be optimized at the N10 interface. As just described, N10 de-registration messages can be optimally sent utilizing a congestion threshold similar to that described above with respect to registration. For example, the SMF 114 can dynamically manage communication of de-registration messages such that they are only communicated with a congestion threshold at the N10 interface is not greater than or is lower than a predetermined congestion threshold.

Additionally, there are aspects of the invention that allow the SMF 114 to intelligently manage delivery of the de-registration messages such that communication via the N10 interface is eliminated, when appropriate. De-registration is generally communicated with a UE leaves a network. The UE may leave the network completely or may temporarily leave the network and return with a new session (via a second SMF) at some later point in time. In the event that the UE returns for a different session, the UDM 110 has already received registration information for the UE for the new session (from the second SMF) and is no longer concerned with information related to the previous session. A de-registration message is redundant and unnecessary as the new session that is currently active overrides any previous session information.

The SMF 114 can identify that a session has terminated by identifying a period of inactivity greater than a threshold inactivity period or upon expiration of a timer. The SMF 114 can also identify that a session has been terminated upon receiving a de-registration message from the UE terminating the session. In any event, the SMF 114 can launch a local de-registration protocol where de-registration of the UE is handled locally, at the SMF 114. The SMF 114 can locally clean up any information related to the previous session and handle de-registration locally while also preventing a communication of an N10 de-registration message via the N10 interface.

By way of a specific example, imagine a UE attaches to a 5G network via a SMF1. The UE leaves the network but then re-enters the network and requests a fresh attach, which is handled by SMF2. The UDM, in communication with both SMF1 and SMF2, is aware of the new attachment. SMF1 can identify that the UE has left by either a timer expiration, receiving a message of termination from the UE, or a period of inactivity greater than a predetermined period of inactivity. Thus, the UDM is now working with SMF2 during an active session so SMF1 needs to de-register the old session. However, the new, active session is fully active and overrides any previous sessions so it is not imperative that the UDM receive the de-registration message urgently, or at all. SMF1 can locally de-register the UE and perform a local clean up but hold on sending a de-registration message to the UDM until a congestion threshold is lower than a predetermined congestion threshold. The predetermined congestion threshold may be uniquely configured for de-registration messages and may be a different threshold value than the predetermined congestion threshold described with respect to registration messages. Alternatively, SMF1 can prevent the de-registration message from being sent at all. This may be desirable in cases where the UDM is in a different active session with the UE or the congestion threshold is greater than the predetermined congestion threshold.

Many different arrangements have been described herein for optimizing N10 communications. Ultimately, with the SMF intelligently and dynamically managing which messages are communicated to the UDM and the timing of communication of those messages to the UDM, traffic will be greatly reduced on the N10 interface and optimized such that we are managing what traffic we add to the load and when it is added.

Turning to FIG. 2, a flow diagram 200 is provided illustrating a flow to optimize N10 communications. Initially, at block 202, a source Radio Access Technology (RAT) associated with a first device on a first network is identified. The source RAT could be a Wi-Fi network, a 5G network, a LTE network, or the like. Based on the source RAT, it is determined that registration information for the first device is available at block 204. The registration information may be available because registration was already completed at the source RAT and is able to be accessed by the UDM and communicated directly to the SMF. At block 206, an N10 registration message is eliminated from being communicated via an N10 interface from the SMF to the UDM.

Turning to FIG. 3, a flow diagram 300 is provided illustrating a flow to optimize N10 communications. Initially, at block 302, an indication of a new session on a target network for a first device originating from a source network is received. At block 304, it is determined that an N10 registration message is not needed based on the source network. This determination is made based on a registration of a UE on the source network already being registered with the source network. Communication of the N10 registration message via an N10 interface is omitted at block 306.

Referring to FIG. 4, a flow diagram 400 is provided illustrating a flow to optimize N10 communications. Initially at a first time, at block 404, a session request from a first device on a first source network to initiate a session on a second target network is identified. It is determined that the first device has not been previously registered at block 406. A first registration message for the first device is communicated at block 408. At block 410, which is at a second time, subsequent to the first time, a handover request is identified for the first device to initiate a second session at a third target network. It is determined that the first registration message was communicated for the first device at block 410. At block 414, a communication of a second registration message via an N10 interface is eliminated.

In FIG. 5, a flow diagram 500 is provided depicting a flow to optimize N10 communications. At block 502, a first session for a first device on a first network, via a first network component is initiated. Initiating the first session can comprise communicating a first registration message including registration information for the first device via an N10 interface. At block 504, an indication that the first device has terminated the first session is received. At block 506, it is identified that the first device has initiated a second session via a second network component. At block 508, a local de-registration protocol at the first network component is initiated. The local de-registration protocol comprises: locally, at the first network component, de-registering the user device; and preventing a communication of an N10 de-registration message via the N10 interface.

In FIG. 6, a flow diagram 600 is provided depicting a flow to optimize N10 communications. Initially, at block 602, a first device is registered with a first Unified Data Management function (UDM), via a first N10 interface between the first UDM and a first Session Management function (SMF), for a first session. It is identified, at block 604, that the first session has ended. At block 606, it is determined whether a congestion threshold at the first N10 interface is above a predetermined congestion threshold. If the congestion threshold is not greater than a predetermined congestion threshold, an N10 de-registration message is communicated to the first UDM from the first SMF at block 608. If the congestion threshold is greater than a predetermined congestion threshold, a local de-registration protocol is activated to (1) locally, at the SMF, de-register the first device and (2) eliminate an N10 de-registration communication to the first UDM at block 610.

Referring to FIG. 7, a block diagram of an exemplary computing device 700 suitable for use in implementations of the technology described herein is provided. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated. It should be noted that although some components in FIG. 7 are shown in the singular, they may be plural. For example, the computing device 700 might include multiple processors or multiple radios. In aspects, the computing device 700 may be a UE/WCD, or other user device, capable of two-way wireless communications with an access point. Some non-limiting examples of the computing device 700 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 7, computing device 700 includes a bus 710 that directly or indirectly couples various components together, including memory 712, processor(s) 714, presentation component(s) 716 (if applicable), radio(s) 724, input/output (I/O) port(s) 718, input/output (I/O) component(s) 720, and power supply(s) 722. Although the components of FIG. 7 are shown with lines for the sake of clarity, in reality, delineating various components is not so clear, and metaphorically, the lines would more accurately be grey and fuzzy. For example, one may consider a presentation component such as a display device to be one of I/O components 720. Also, processors, such as one or more processors 714, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 712 may take the form of memory components described herein. Thus, further elaboration will not be provided here, but it should be noted that memory 712 may include any type of tangible medium that is capable of storing information, such as a database. A database may be any collection of records, data, and/or information. In one embodiment, memory 712 may include a set of embodied computer-executable instructions that, when executed, facilitate various functions or elements disclosed herein. These embodied instructions will variously be referred to as "instructions" or an "application" for short.

Processor 714 may actually be multiple processors that receive instructions and process them accordingly. Presentation component 716 may include a display, a speaker, and/or other components that may present information (e.g., a display, a screen, a lamp (LED), a graphical user interface (GUI), and/or even lighted keyboards) through visual, auditory, and/or other tactile cues.

Radio 724 represents a radio that facilitates communication with a wireless telecommunications network. Illustrative wireless telecommunications technologies include CDMA, GPRS, TDMA, GSM, and the like. Radio 724 might additionally or alternatively facilitate other types of wireless communications including Wi-Fi, WiMAX, LTE, 3G, 4G, LTE, mMIMO/5G, NR, VOLTE, or other VoIP communications. As can be appreciated, in various embodiments, radio 724 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 718 may take a variety of forms. Exemplary I/O ports may include a USB jack, a stereo jack, an infrared port, a firewire port, other proprietary communications ports, and the like. Input/output (I/O) components 720 may comprise keyboards, microphones, speakers, touchscreens, and/or any other item usable to directly or indirectly input data into the computing device 700.

Power supply 722 may include batteries, fuel cells, and/or any other component that may act as a power source to supply power to the computing device 700 or to other network components, including through one or more electrical connections or couplings. Power supply 722 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A system for optimizing N10 interface communications, the system comprising:
   one or more processors; and
   one or more computer-readable media storing computer-usable instructions that, when executed by the one or more processors, cause the one or more processors to:
   identify a source Radio Access Technology (RAT) associated with a first device on a first network;
   based on the source RAT, determine that registration information for the first device is available;
   eliminate an N10 registration message from being communicated via an N10 interface; and
   communicating a subscription fetch or subscribe to notify message via an N10 interface based on a congestion threshold for the N10 interface, wherein the subscription fetch or subscribe to notify message are communicated when the congestion threshold for the N10 interface is below a predetermined threshold and suppressed when the congestion threshold for the N10 interface is above the predetermined threshold.

2. The system of claim 1, wherein the one or more processors is further configured to identify a handover of the first device from the first network to a second network.

3. The system of claim 2, wherein the first network is a Wi-Fi network.

4. The system of claim 3, wherein the second network is one of a 5G network or a Long Term Evolution (LTE) network.

5. The system of claim 2, wherein the first network is a Long Term Evolution (LTE) network.

6. The system of claim 5, wherein the second network is one of a 5G network or a Wi-Fi network.

7. The system of claim 2, wherein the first network is a 5G network.

8. The system of claim 7, wherein the second network is one of a Wi-Fi network or a Long Term Evolution (LTE) network.

9. The system of claim 1, wherein the elimination of the N10 registration message is managed by a first Session Management function (SMF) on a second network.

10. A method for optimizing N10 interface communications, the method comprising:

receiving an indication of a new session on a target network for a first device originating from a source network;

determining that an N10 registration message is not needed based on the source network; and omitting communication of the N10 registration message via an N10 interface, wherein when the target network is a 5G network, one or more of a subscription fetch or a subscribe to notify message is communicated via the N10 interface based on a congestion threshold for the N10 interface.

11. The method of claim 10, wherein the source network is one of a Wi-Fi network, a 5G network, or a Long Term Evolution (LTE) network.

12. The method of claim 11, wherein the subscription fetch and subscribe to notify messages are communicated via the N10 interface when the congestion threshold for the N10 interface is below a predetermined threshold.

13. The method of claim 11, wherein the subscription fetch and subscribe to notify message are not communicated via the N10 interface when the congestion threshold for the N10 interface is above a predetermined threshold.

14. The method of claim 10, wherein the first device is associated with an IP Multimedia Subsystem (IMS) Access Point Name (APN).

15. The method of claim 10, wherein the first device is associated with an Internet Access Point Name (APN).

16. A system for optimizing N10 interface communications, the system comprising:

one or more processors; and one or more computer-readable media storing computer-usable instructions that, when executed by the one or more processors, cause the one or more processors to:

at a first time:

identify a session request from a first device on a first source network to initiate a session on a second target network;

determine that the first device has not been previously registered; and communicate a first registration message for the first device; at a second time, subsequent to the first time:

identify a handover request for the first device to initiate a second session at a third target network;

determine that the first registration message was communicated for the first device; and eliminate a communication of a second registration message via an N10 interface, wherein a subscription fetch message and a subscribe to notify message is communicated via the N10 interface based on a congestion threshold at the N10 interface.

17. The system of claim 16, wherein the first registration message is received at a Session Management function (SMF) from a network component of one of a Wi-Fi network or a Long Term Evolution (LTE) network.

18. The system of claim 17, wherein the first source network is a Wi-Fi network, the second target network is a 5G network, and the third source network is a Long Term Evolution (LTE) network.

\* \* \* \* \*